US005858076A

United States Patent [19]

Thompson

[11] Patent Number: 5,858,076

[45] Date of Patent: Jan. 12, 1999

[54] COATING COMPOSITION FOR PAPER AND PAPER BOARDS CONTAINING STARCH AND SMECTITE CLAY

[75] Inventor: Thomas D. Thompson, Hephzibah, Ga.

[73] Assignee: Albion Kaolin Company, Hephzibah, Ga.

[21] Appl. No.: 664,324

[22] Filed: Jun. 7, 1996

[51] Int. Cl.[6] ........................ C09D 103/02; C09D 103/08

[52] U.S. Cl. ........................ 106/217.3

[58] Field of Search ........................ 106/217.3

[56] References Cited

U.S. PATENT DOCUMENTS

| | | | |
|---|---|---|---|
| 2,235,676 | 3/1941 | Gardner | 106/217.3 |
| 2,795,545 | 6/1957 | Gluesenkamp . | |
| 3,508,952 | 4/1970 | Eykamp et al. . | |
| 3,607,331 | 9/1971 | Strother et al. . | |
| 3,869,296 | 3/1975 | Kelly, Jr. et al. . | |
| 4,210,490 | 7/1980 | Taylor . | |
| 4,385,961 | 5/1983 | Svending et al. . | |
| 4,388,150 | 6/1983 | Sunden et al. . | |
| 4,867,844 | 9/1989 | Dessaver . | |
| 5,071,512 | 12/1991 | Bixler et al. . | |
| 5,126,014 | 6/1992 | Chung . | |
| 5,277,764 | 1/1994 | Johansson et al. . | |
| 5,283,129 | 2/1994 | Renk et al. . | |
| 5,494,509 | 2/1996 | Kruythoff et al. . | |

FOREIGN PATENT DOCUMENTS

| | | |
|---|---|---|
| 0192252 | 8/1986 | European Pat. Off. . |
| 0283300 | 9/1988 | European Pat. Off. . |
| 2248625 | 4/1974 | Germany . |

OTHER PUBLICATIONS

Derwent WPI: Kanzaki Paper Manufacturing Code Limited, (May 17, 1991), Abstract.

Oja, Mark E, et al. "Metered Size Presses: Starch Runnability and Paper Properties" Tappi Journal, pp. 115–117 (Aug. 1991).

Brindley, G.W. et al. "Methylene Blue Absorption by Montmorillonites, Determinations of Surface Areas and Exchange Capacities with Different Initial Cation Saturations (Clay–Organic Studies XIX)" *Israel Journal of Chemistry*, pp. 409–415, vol. 8, (1970).

Abell, Steve, "Starch–Based Binders Offer Easy Pigment Application at Size Press," Pulp and Paper, pp. 99–105, (May 1995).

Jopson, R.N. et al., "On–line Surface Treatment to Enhance Market Value", Tappi Journal, pp. 113–119 (Apr. 1991).

Stinebaugh, Douglas K. "Preparation of Starch for Pigmented Coatings" Chap. 2, Section II, The Coating Processes, pp. 21–30.

*Primary Examiner*—David Brunsman
*Attorney, Agent, or Firm*—Scott R. Cox

[57] ABSTRACT

An aqueous coating composition for paper or paper boards comprising a mixture of smectite clay with starch in an aqueous solution wherein the starch comprises about 75 to about 95 percent by weight and the swellable clay comprises about 5 to about 25 percent by weight of the solids content of the aqueous coating composition. In addition, there is disclosed a process for the production of an aqueous coating composition for paper containing a smectite clay.

24 Claims, 19 Drawing Sheets

FIG. 1

| SAMPLE ID | FORMULATION | PERCENT TOTAL SOLIDS |
|---|---|---|
| 00 | Uncoated/Uncalendered | ------ |
| 0 | Uncoated/Calendered | ------ |
| 1 | 100% Penford 270 | 8.87% |
| 2 | 100% Penford Appollo 4270 | 7.41% |
| 3 | 10% Printosil (wet)/90% 270 | 7.19% |
| 4 | 10% Printosil (dry)/95% 270 | 7.69% |
| 5 | 5% Sodium Bentonite/95% 270 | 8.38% |
| 5A | same as 5, uncalendered | 8.38% |
| 7 | 10% Sodium Bentonite/90% 270 | 8.43% |
| 8 | 5% Printosil (wet)/95% 270 | 7.17% |
| 9 | 5% Printosil (wet)/95% 4270 | 8.09% |

| FORMULATION (ID NUMBER) | UNCOATED WT. | COATED WT. | PICKUP (LBS/TON | CALIPER (MLS) |
|---|---|---|---|---|
| Uncoated/Uncalendered (00) | 55 lbs/3000 sq ft | ------ | 0 | 4.5 |
| Uncoated/Calendered (0) | 48 lbs/3000 sq ft | ------ | 0 | 4.7 |
| 100% 270 (1) | 48 lbs/3000 sq ft | 50.4 lbs | 109.5 | 4.7 |
| 100% 4270 (2) | 55 lbs/3000 sq ft | 57.1 lbs | 70.5 | 4.9 |
| 10% Printosil (wet)/90% 270 (3) | 55 lbs/3000 sq ft | 56.0 lbs | 56.1 | 4.8 |
| 10% Printosil (dry)/90% 270 (4) | 58 lbs/3000 sq ft | 59.8 lbs | 56.3 | 4.9 |
| 5% Na Bentonite/95% 270 (5) | 48 lbs/3000 sq ft | 50.3 lbs | 98.1 | 4.6 |
| 5% Na Bentonite/95% 270 (5A) | 48 lbs/3000 sq ft | 50.3 lbs | 98.1 | 4.6 |
| 10% Na Bentonite/90% 270 (7) | 48 lbs/3000 sq ft | 49.5 lbs | 83.1 | 4.6 |
| 5% Printosil (wet)/95% 270 (8) | 48 lbs/3000 sq ft | 50.3 lbs | 67.7 | 4.7 |
| 5% Printosil (wet)/4270 (9) | 57 lbs/3000 sq ft | 58.5 lbs | 84.9 | 4.8 |

FIG. 2

| TEST | TAPPI METHOD NUMBER |
|---|---|
| basis weight, caliper, density, bulk | T410, T411 |
| burst strength | T 403 |
| folding endurance | T 511 |
| opacity | T 519 |
| smoothness (Sheffield) | T 538 |
| porosity (Sheffield) | T 547 |
| z direction tensile strength | T 541 |
| wax pick strength | T 459 |

BRIGHTNESS

OPACITY

WAX PICK

COATING COMPOSITION FOR PAPER AND PAPER BOARDS CONTAINING STARCH AND SMECTITE CLAY

BACKGROUND OF INVENTION

1. Field of Invention

This invention relates to paper coating compositions. More particularly, it relates to paper and paper board coating compositions containing smectite clays and starch which improve the performance of the paper and paper boards.

2. Prior Art

Chemicals, additives and polymers are often added to paper and paper boards in order to improve their performance. In order to obtain high quality paper it is necessary that the surface of the paper be smooth and have uniform porosity. Smooth and uniform paper is a prerequisite for good images printed thereon and also for good transfer of ink to the paper.

Smooth paper is conventionally obtained by coating the raw paper surface with a pigment composition. Coating compositions which create a smooth surface on paper have generally been aqueous dispersions, comprising mainly mineral fillers or pigments, such as Kaolin clay, calcium carbonate, and titanium oxide along with pigment binders of natural proteins, for example, casein or soy protein, starch or synthetic polymer emulsions. Coating compositions are usually applied to a continuous web of paper by high speed coating machines, such as blade coaters, air knife coaters, rod coaters and roll coaters.

The flow properties or runnability of coating compositions for paper and paper boards are of significant importance. These flow properties are often controlled by a thickener or co-binder.

The most common polymer used for the coating of paper is starch, preferably a modified starch such as hydroxyethylated starch. These modified starches can be augmented with other additives such as strengthening aids or hydrophobes. An example of a bulk strengthening aid, other than starch, is polyvinyl alcohol. Examples of hydrophobes or water repellant crosslinking agents are styrene acrylic polymers and melamine formaldehyde resins.

The clays conventionally used for pigments are preferably kaolinite or similar clays which generally has a relatively low surface area of about 10 to 25 $m^2/g$, relatively low viscosity of less than 100 centipoise at 10% solids and a relatively low aspect ratio of less than 50 to 1. (Aspect ratio is generally recognized in the industry as the ratio of the diameter to the thickness of the particular particle.) These clays, which are conventionally used as pigments or fillers, are generally used in pure form and are easily dispersible in water. For best results, these clays are used in slurry form with high clay concentrations of at least about 40 percent, with the lowest reasonable viscosity, preferably less than 100 centipoise.

Starch has also been used in these pigment coating compositions. In these compositions the clay is used as the pigment with the starch forming the adhesion material for adhering the clay pigment to the paper. For example, U.S. Pat. No. 3,607,331 discloses a paper coating composition comprising 30 to 50 percent clay, 5 to 7 percent a water soluble starch, 35 to 55 percent water and a starch insolubilizing agent.

European Patent Application No. 283 300 discloses a method of producing a coated paper suitable for gravure printing using a clay pigment. The printing process utilized does not require the paper to have high surface strength. The pigment is comprised predominantly of a water swellable, smectite-type clay. The suspension applied to the paper for use as a pigment contains up to 20 percent by weight of the pigment. In some of the Examples in the application, the smectite clay was merely slurried with water and then applied as a pigment to the surface of the paper. In Examples 3 and 4, a paper coating adhesive was added to the clay to assist in the binding of the smectite clay to the paper surface. In Example 3 the adhesive product was a latex of an acrylic copolymer, while in Example 4 a starch paper coating adhesive was used, wherein up to three times as much starch by weight as bentonite clay was used to secure it to the paper.

U.S. Pat. No. 3,869,296 discloses a paper pigment composition, wherein starch is utilized to adhere the pigment, such as a kaolin clay, to the paper, wherein a latent water insolubilizer for the starch is also added to the coating composition. Preferably, 100 parts of clay are combined with 20 parts of starch in the coating composition.

U.S. Pat. Nos. 5,283,129 and 5,494,509 disclose pigment coating compositions, wherein various materials are added to the clay/starch composition to enhance the quality of the paper. In each of these patents the starch is utilized as the binding agent for the clay, while the clay forms the pigment for the coating. In U.S. Pat. No. 5,283,129 the ratio of the clay to the starch binder is from about 75 up to 90 parts clay pigment to about 15 to 30 parts starch binder. In U.S. Pat. No. 5,494,509 the clay pigment portion comprises approximately 60 percent of the pigment slurry.

A binder complex, such as a colloidal silicic acid or cationic starch, is also commonly used to bind a filler to paper wherein the filler may be comprised of a kaolin, bentonite, titanium oxide, chalk or talc in U.S. Pat. Nos. 4,388,150, 4,385,961 and 5,071,512. See also U.S. Pat. Nos. 2,795,545 and 4,210,490.

Starch and clay products, such as bentonite clay, have also been utilized with cellulose fibers in the formation of paper and pulp sheets. For example, U.S. Pat. No. 4,210,490 discloses the combination of a cationic starch with a kaolin clay filler mixed with an aqueous solution of cellulosic fibers to form a paper product. See also U.S. Pat. No. 5,277,764 which discloses the utilization of a highly cationized starch for the formation of paper. See also U.S. Pat. No. 5,126,014.

When starch is used in paper coatings, but not as a binder to bind pigments to the paper, its primary role is twofold: (1) to penetrate into the sheet of paper in order to provide bulk strength and (2) to remain on the surface of the paper to improve surface strength, control porosity and absorbency. These two roles are in conflict as improvements in surface strength, porosity and absorbency require the starch to remain on the surface while improvements in bulk strength are achieved only through penetration of the starch into the paper sheet. Controlling the penetration of the starch into the paper sheet is thus necessary to balance these two characteristics and thus achieve optimum performance for the paper product.

In addition to controlling the extent of the penetration of the starch into the paper, enhanced quality for the paper products can be achieved by controlling the retrogradation of the starch product. Retrogradation, which is the association of starch chains, results in an increase in viscosity of a starch solution as that solution is cooled. Retrogradation problems are particularly present with unmodified starches, such as pearl starch, while they are less of a problem with modified starches, such as hydroxyethylated starches and particularly cationic starches. Being able to control the extent of penetration of the starch into a base sheet of paper and at the same time being able to stabilize the viscosity of the starch (retrogradation) would offer definite advantages in the production of paper.

Therefore, it is an object of this invention to produce a surface modifier for paper comprised of a smectite clay and starch which will both control the penetration of the starch into the paper and reduce its rate of retrogradation.

It is a further object of this invention to produce a coating for paper which will decrease the porosity of the sheets.

It is a still further object of this invention to produce a coating for paper with improved printing characteristics.

It is a still further object of this invention to provide a precoat for paper and boards to prevent a final coating from migrating into the sheet.

It is a still further object of this invention to produce a coating for paper comprised of a smectite clay and starch which does not require the use of a cationic starch.

It is a further object of this invention to produce a coating for paper with high viscosity at low solids and a very high aspect ratio.

These and other objects and features of the present invention will become apparent to those skilled in the art from a consideration of the following detailed description and claims. The description provides selected examples of the preferred embodiment of the invention to illustrate the invention.

SUMMARY OF INVENTION

In accordance with the invention there is provided an improved aqueous coating composition for paper comprising from about 5 to about 25 percent by weight solids, wherein the solids comprise (a) about 75 to about 95 percent by weight starch, and (b) about 5 to about 25 parts by weight smectite clay.

Wetting or dispersing agents can also be added to the composition to enhance the wetting out of the smectite.

Preferably, the smectite clay is a high surface area clay with a surface area from about 200 to about 800 $m^2/g$, wherein the clay particles have a fine particle size of about 90 percent less than 2 $\mu m$, wherein the coating composition has a high viscosity from about 100 to about 3,000 centipoise at 10 percent solids and a high aspect ratio from about 200 to about 1,000/1.

There is also disclosed a process for the production of a paper product with improved printing characteristics comprising preparing a conventional uncoated paper product;

preparing a coating composition comprising an aqueous solution of starch and smectite clay, wherein the solids content of the aqueous solution is from about 5 to about 25 percent and wherein those solids are comprised of about 5 to about 25 percent smectite clay and from about 75 to about 95 percent starch, coating the uncoated paper product with the coating composition to produce a coated paper product, and treating the coated paper product to produce a paper end product.

The process can be enhanced by blending the smectite clay with a treated starch and by blending the pretreated starch with the smectite clay before the starch is modified or cooked. The end product can also be enhanced by substantial cleaning of the smectite clay prior to its combination with the starch to remove substantially all non-smectite impurities.

BRIEF DESCRIPTION OF THE DRAWINGS

FIG. 1 lists the samples of the coatings that were applied to the base sheet, including their uncoated weight, coated weight, pickup and caliper.

FIG. 2 shows the types of tests run on the samples.

DETAILED DESCRIPTION OF THE PREFERRED EMBODIMENT

Figure 3A:
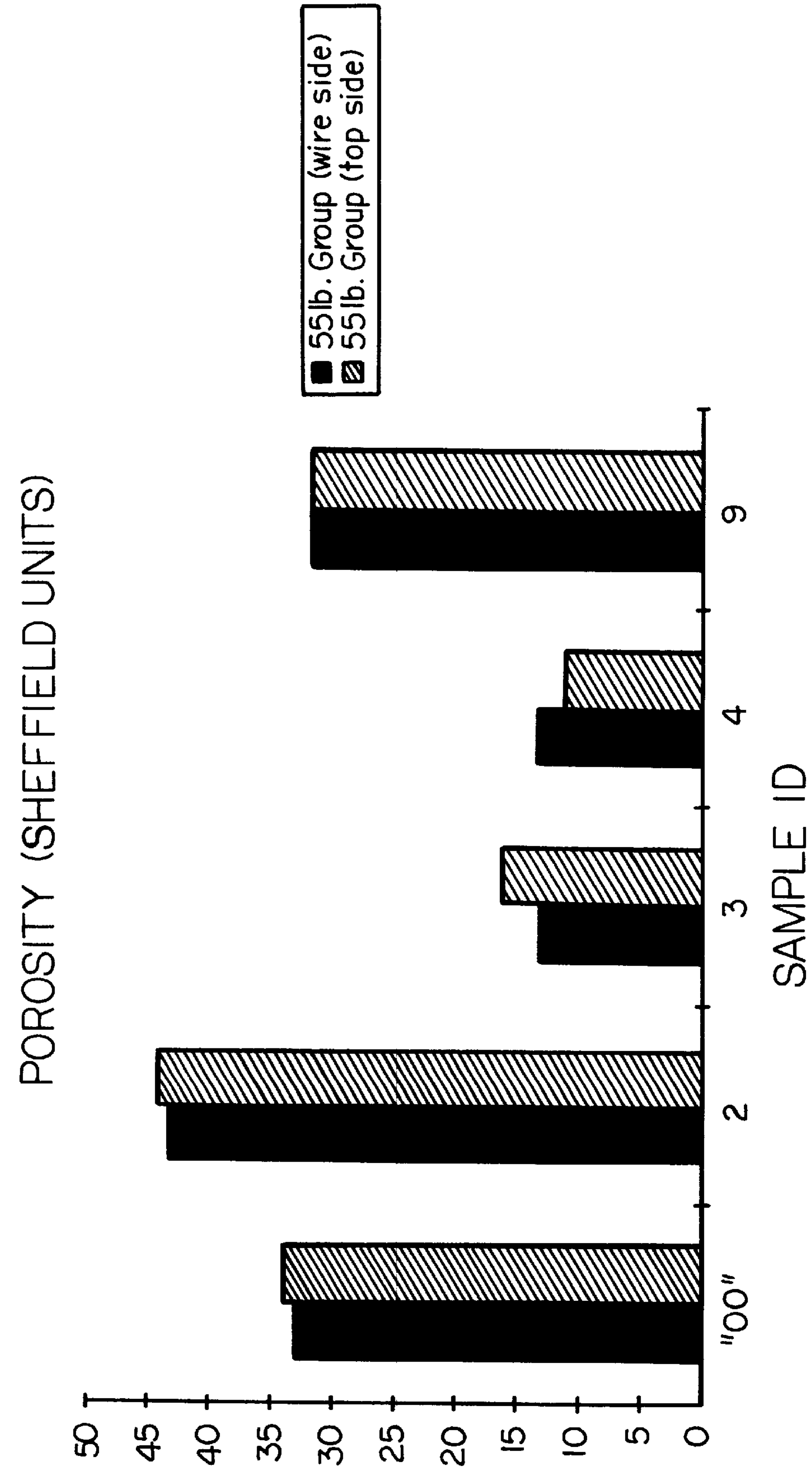
FIG. 3A shows the porosity for the 55 pound paper group of the samples.
Figure 3B:
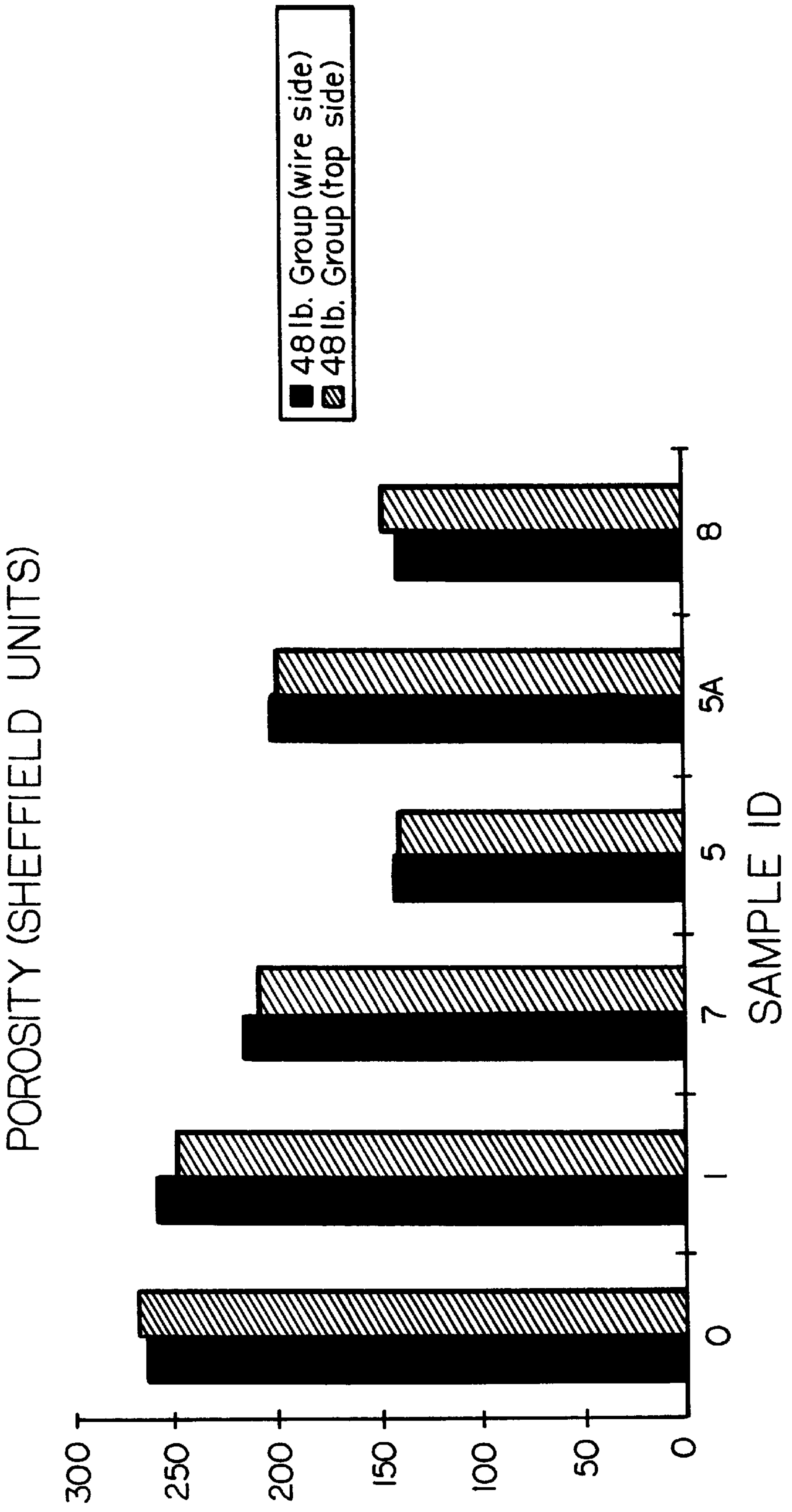
FIG. 3B shows the porosity for the 48 pound paper group of the samples.

Although the invention is adaptable to a wide variety of uses, it is generally comprised of a coating composition for the coating of paper or paper boards comprising starch and a smectite clay. This composition decreases the porosity of the paper and improves its printing characteristics. The invention also includes a process for the production of an improved paper product utilizing a coating composition comprising starch and smectite clay.

Clays useful for this process are preferably chosen from the smectite group, such as bentonite, montmorillonite, hectorite, saponite, or nontronite, with bentonites being preferable. Synthetic smectites may also be used in the process. Both sodium and calcium bentonites can be used in the process.

The clay, preferably bentonite clay, is first dispersed in water in a conventional procedure to produce a slurry. Preferably the solid content of this slurry will range from about 3 to about 50 percent, and more preferably from about 5 to about 25 percent.

The smectite clay slurries are next treated to remove foreign substances such as sand, feldspar, quartz, calcite and other hard impurities (sometimes referred to as “grit”). This precleaning or degritting of the clay slurries can be carried out by a number of procedures conventional in the industry including grinding, sorting, cyclone separators and other such conventional degritting processes. Preferably, the slurry is degritted by conventional centrifugation, such as by use of a hydrocyclone. Further centrifugation, using higher g-force, may be useful to remove additional quartz, feldspar and grit impurities from the bentonite clay and thus control the particle size of the clay. Such additional degritting enhances the quality of the smectite clay end product.

Following the degritting of the clay slurry, the slurry is treated to remove soluble salts. Preferably, soluble salts such as gypsum, epsom salts, sodium sulfate, etc. are removed either by rinsing the clay slurries with deionized water, using dialysis tubing or by the passing of the clay through a mixed bed ion exchange column. This process reduces substantially the viscosity of the smectites. Soluble salts of sufficient quantity should also be removed, such that the resistivity of the clay slurry measured by means of a resistivity meter is no less than about 3,000 ohms. The resistivity of natural bentonites are between about 200 to 600 ohms. The removal of soluble salts enhances significantly the quality of the clay end product by reducing its viscosity and yield point well below that of smectite clay slurries wherein the soluble salts are not removed or are not substantially removed.

Following the removal of the soluble salts, the clay slurries are fractionated to narrow the range of the particle size of the clay particles. Preferably, the fractionation occurs through a centrifugation process. For example, the slurry can be passed through a decanter-type centrifuge, such as is produced by Bird or Sharples or a disc-stack type centrifuge, such as is produced by Alfa Lava, at high enough g-force to effectively fractionate the particles of the clay slurry. In one preferred procedure, the fractionation occurs through use of an International centrifuge at speeds of at least about 500 rpms for at least about 15 minutes. The clay particles separated during the centrifugation process should be in the range of about 85%<0.5 $\mu$m to about 99%<0.5 $\mu$m and preferably 90%<0.5 $\mu$m to about 95%<0.5 $\mu$m in size for sodium smectite clay particles and from about 60% 0.5 $\mu$m to about 80%<0.5 $\mu$m, preferably 75%<0.5 $\mu$m to about 90%<0.5 $\mu$m for calcium smectite. Overall, the particle size of the smectite clay should be at least about 90% less than 2.0 $\mu$m. The particle size measurements can be made by conventional means.

Following fractionation, sodium and calcium clay slurries can be blended together to form a blended clay slurry. The blend of sodium and calcium smectites results in improved characteristics for the clay end product which are not present if either substantially pure calcium smectite or substantially pure sodium smectite are used. For example, sodium smectite has a higher aspect ratio and surface area than calcium smectites and, therefore, provides better coverage of the base sheet. However, sodium smectites generally have higher viscosity and a high yield point, causing problems of runnability in standard coating processes. Calcium smectites have lower viscosity and virtually no yield point which is quite useful for conventional paper coating equipment. While the sodium and calcium bentonite clay slurries preferably should be kept separate prior to their combination, in an alternative embodiment, mixtures of sodium and calcium bentonite clay slurries can be utilized as long as the preferred ratios between the sodium and calcium smectite clays is maintained. For further details on this process, see U.S. Pat. No. 5,529,622.

As noted above, smectites have been used previously in paper making applications, principally as a filler to control pitch deposition and as a pigment. Such uses are, however, different from the use of the smectite in the present invention in that the smectite used to control pitch is added to the fiber pulp much earlier in the paper making process than in the present invention. The use of clays, preferably kaolin clays, as pigments also differs from the use of smectites in the present invention in that the type of clay utilized for the pigment is different from that in the instant application and the ratios of the starch to the clays are also significantly different.

The smectite clays utilized for the present invention have characteristics which also differ significantly from the kaolin clays that are conventionally used as pigments or fillers in the paper making process. See, for example, U.S. Pat. No. 5,494,509, column 3, line 68. Kaolin clays generally have a low surface area in the range of 25 $m^2/g$, whereas the smectite clays of the present invention have a significantly higher surface area in the range of 200 to 800 $m^2/g$. In addition, the smectite clays utilized in the present invention have a much higher viscosity in the range of 50 to as much as 5,000 centipoise, preferably 100 to as much as 3000 centipoise in a 10 percent solids composition. Further, the aspect ratio is also much higher, in the range of 200 to 1,000 to 1. Thus, the smectite clays used to form the coating composition are significantly different types of clay than the kaolin-type conventionally used as pigments or fillers for paper.

The starches that are utilized in this invention can include unmodified starches, oxidized starch, enzyme-converted starches and modified starches containing functional groups such as hydroxyl, carbonyl, amido and amino groups. The term “starch” therefore as used throughout this specification and claims is intended to include any member of the family of starches, or mixture of two or more starches. The particularly preferred starch is a modified starch, such as an oxidized, enzyme-converted starch.

Ordinary starch, such as pearl starch, is not commonly utilized in its raw state in the paper making operation because of its high viscosity and retrogradation, which is a particular problem with unmodified starches. The problems related to retrogradation are reduced substantially with modified starches, such as hydroxyethylated starches. As such, most industries convert their unmodified starches to modified starches, such as oxidized, enzyme converted or hydroxyethylated starch prior to the paper making process. Alternatively, a further modified starch, in the form of a cationic starch, can be used. However, the cost of such cationic starch is significant in comparison to either unmodified or hydroxyethylated starch. Because the smectite clay utilized in this process results in a substantially improved coating composition over prior art coatings, it is often possible to produce high quality paper products substituting hydroxyethylated starch for the previously preferred cationic starch.

In the process for production of this starch/smectite clay coating composition, the uncoated paper product is first formed. This paper is produced by conventional procedures well known in the industry. To this paper is applied an aqueous coating composition comprising about 5 to about 25 percent by weight solids, wherein the solids are comprised of about 75 to about 95 parts and preferably about 90 to about 95 parts by weight a starch and about 5 to about 25 parts, preferably 5 to about 10 parts by weight a precleaned, smectite clay.

In forming this coating composition, the smectite clay can be blended with the starch prior to the modification and/or cooking of the starch or it can be added to the starch after the modification and/or cooking process. In a preferred process, the smectite clay is added to the starch prior to the cooking process. The smectite clay can be added directly or as part of a slurry. The starch can be modified through any conventional starch modification process, either by the starch supplier or the paper maker. Cooking the starch at temperatures of about 70 to about 90 degrees C° for a period of about 20 to about 50 minutes fully hydrates the starch and gives it its adhesive properties. If the bentonite clay is added to the starch, it may be added at any time during the cooking of the starch, but preferably it is added prior to the cooking of the starch. It has been surprisingly discovered that a coating composition containing starch and smectite clay, wherein the smectite clay has been added prior to the modification and/or cooking of the starch, has reduced viscosity over coating compositions containing starch and clay where the clay is added after the modification and/or cooking of the starch.

As previously discussed, prior to the blending of the smectite clay with the starch, it is important that the smectite clay be cleaned to remove substantially all of the nonclay impurities. The process for the removal of these nonclay particles and for the cleaning of the swellable clay has been previously discussed and includes processes such as dry grinding, air classification, fractionation, certification and other well known means for the cleaning of the smectite clay.

Once the smectite clay is mixed with the starch, either before or after the modification or cooking of the starch, additional water may be added to the solution to form the final coating composition for paper. Wetting or dispersing agents can also be added to the solution to enhance the wetting out of the smectite. After the combination smectite clay/starch coating composition is prepared, it is applied to the paper or paper board by conventional methods to produce the coated paper product.

EXAMPLES

A. PROCEDURE

To determine the effectiveness of the smectite clay/starch coating composition, various examples of the coating were prepared and applied to a nominal 45 pound per 3,000 square foot base sheet. The coating weight was in the range of 1 lb. to 3 lbs. per 3,000 square feet. The base sheet was slightly rosin sized, but was not surface sized or coated. The smectite clay utilized was either a calcium bentonite treated with $NaCO_3$ (Printosil provided by Sud-Chemie) or a conventional saturated sodium bentonite. The Printosil product has sodium and calcium in its exchange sites and a surface area of 500 $m^2/g$ while the sodium saturated smectite has a surface area of 620 $m^2/g$. Several starch products were utilized including a hydroxyethylated starch (Penford 270 provided by Penford Corporation) and a cationic starch (Penford Apollo 4270 also provided by Penford Corporation).

To prepare the coating composition containing starch and smectite clay, 2.63 pounds of the smectite clay was added to 30 gallons of water and mixed using a high shear mixer. 23.7 pounds of dry starch was then added, mixed and injected with steam to cook. This mixture was cooked for 25 minutes at 195 degrees F. The coating composition had 10% solids, comprising 10% smectite clay and 90% starch. The paper was coated using a flooded, nip size press configured for horizontal sheet run. After the paper was coated, some samples of the paper were calendered and some were left uncalendered. While the paper was claimed to be 45 lbs. per 3,000 square foot, the weight of the paper after coating was either 48 lbs. or 55 lbs. The speed of the run of the paper was 150 feet per minute. The paper was calendered using an on-machine calender operated with one nip at 150 pli. Hard steel rolls were used in the process. The nip press was a pilot scale machine, 30 inches wide. Steam can dryers were used to dry the coating.

B. FORMULATION OF PAPER

The following samples, formulation, percent total solids, uncoated weight, coated weight pickup, and calipers were utilized in the tests as shown in FIG. 1. The tests run on the samples are shown in FIG. 2.

RESULTS OF TESTS

1. Porosity and Smoothness

The porosity data is summarized in FIG. 3A for the 55 paper pound group with the porosity represented in Sheffield units. As can be seen, the porosity of the paper treated with wet processed Printosil clay and cationic starch (Example 9) is lower than the paper treated with cationic starch alone (Example 2). In addition, the porosities of the papers treated with wet and dry processed Printosil hydroxyethylated starch (Examples 3 and 4) are substantially lower than the porosity of the paper treated only with cationic starch. The Printosil was processed by air flotation for the dry processing and using hydrocyclones for wet processing.

Table 3B shows a decrease in porosity for the 48 lb. paper treated with the smectite clay and starch combination (Examples 7, 5, 5A and 8) over paper treated with cationic starch alone (Example 1), thus, disclosing a significant improvement for the paper coated with the hydroxyethylated starch and swellable clay.

Figure 4A:
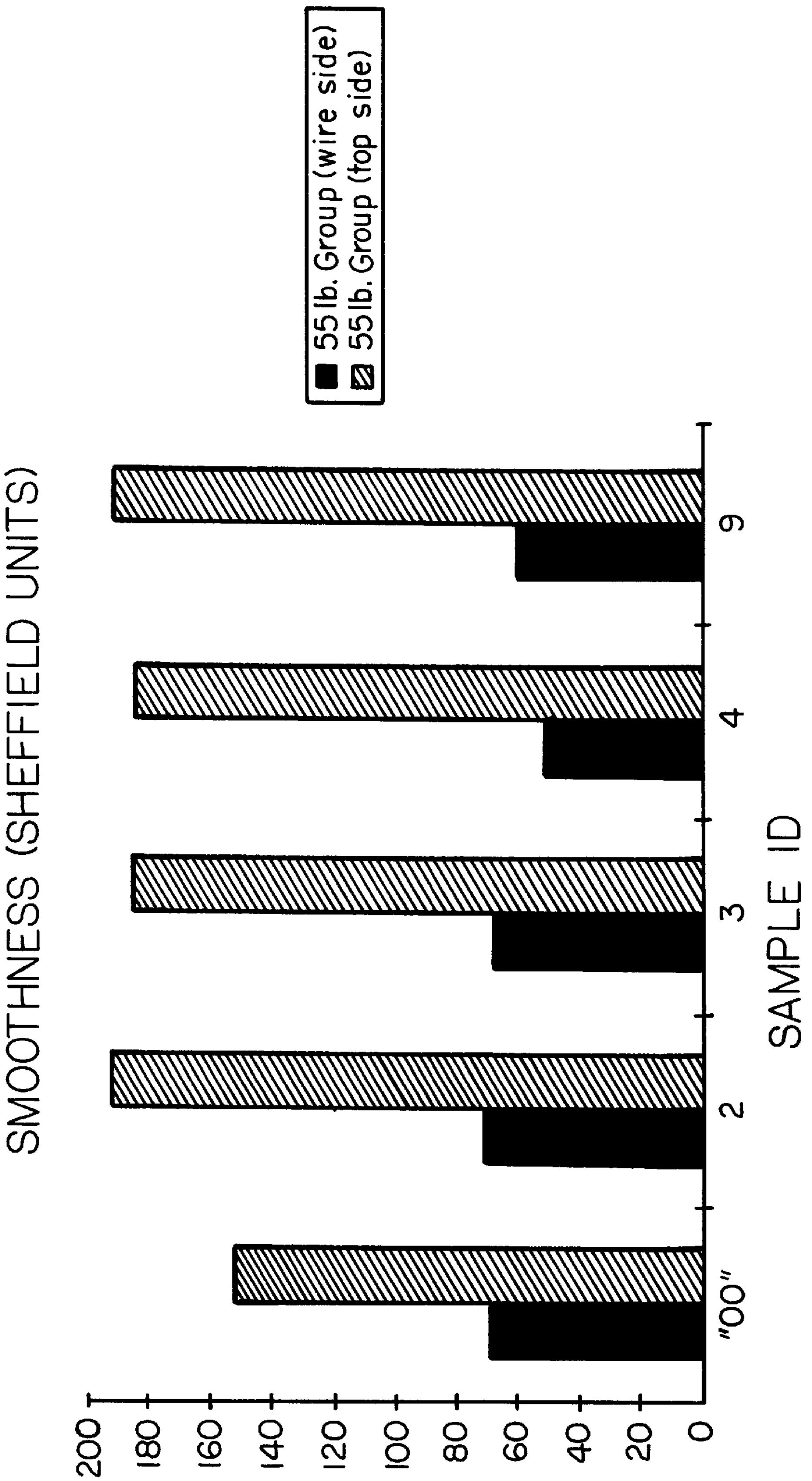
FIG. 4A shows the smoothness for the 55 pound paper group of the samples.
Figure 4B:
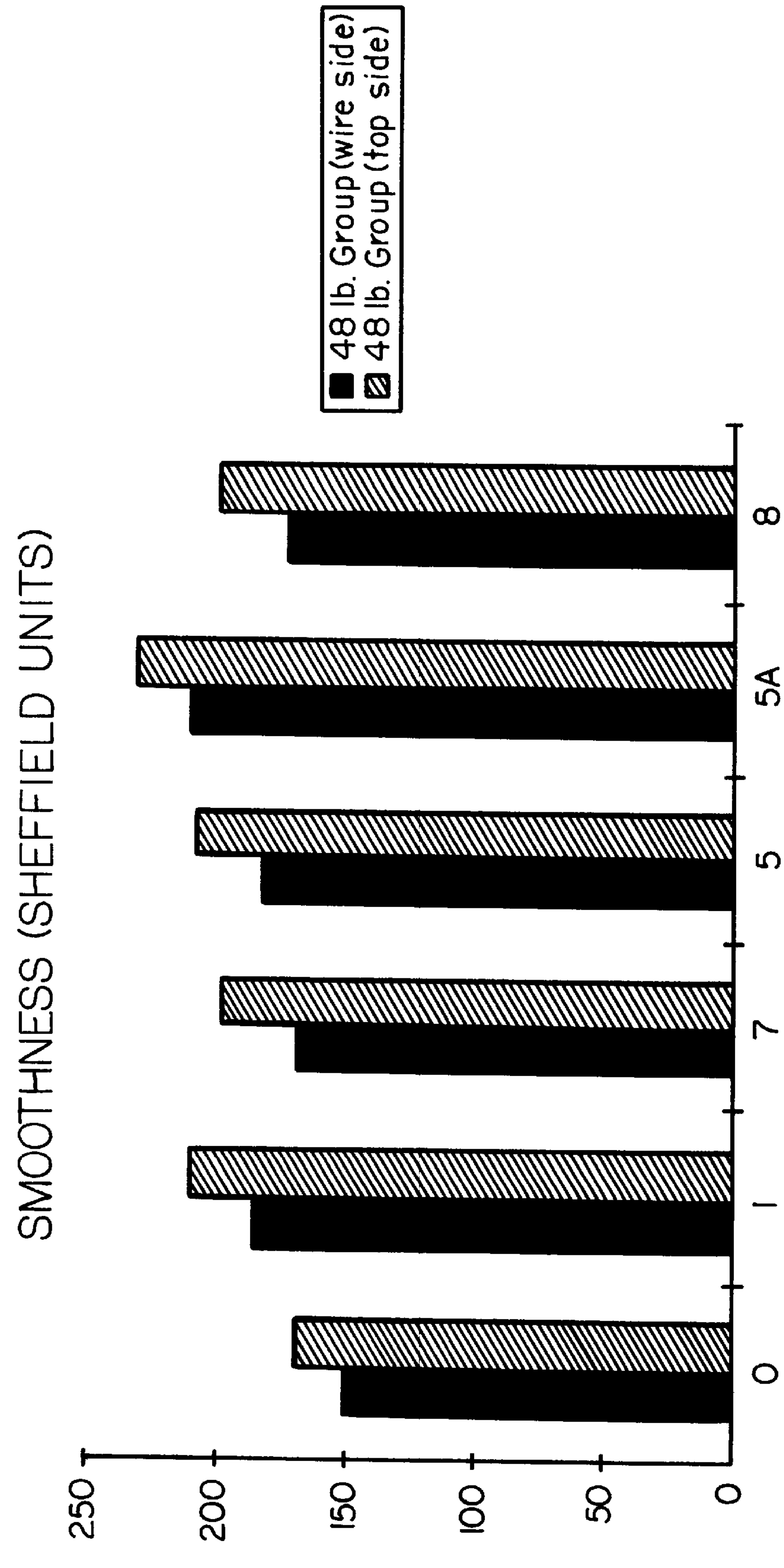
FIG. 4B shows the smoothness for the 48 pound paper group of the samples.

Little differences existed among the various samples in smoothness as shown in FIGS. 4A and 4B. Thus, the paper coated with the combination smectite clay and starch were equally smooth with the papers that did not utilize clay. The smoothness of the paper was accordingly not adversely affected by the addition of clay to the starch combination process.

Normally, assuming all other variables are equal, a paper treated with a hydroxyethylated starch would have a higher porosity than a paper treated with a cationic starch. However, because the paper treated with a swellable clay with the hydroxyethylated starch resulted in lower porosity than the paper treated with cationic starch alone, significant possibilities for savings exist because of the higher cost of the cationic starch.

2. Brightness and Opacity

Figure 5:
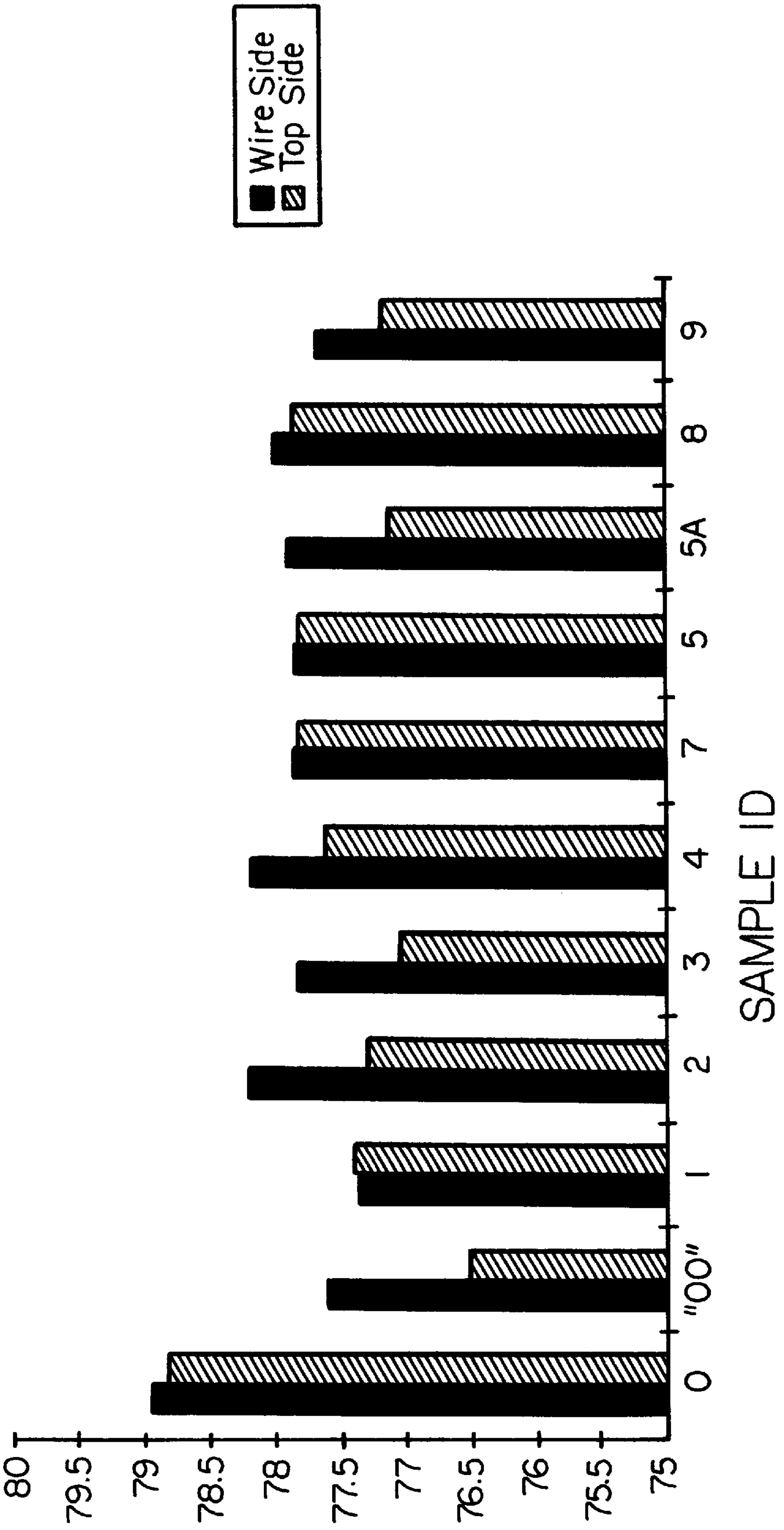
FIG. 5 shows the brightness of the samples.
Figure 6A:
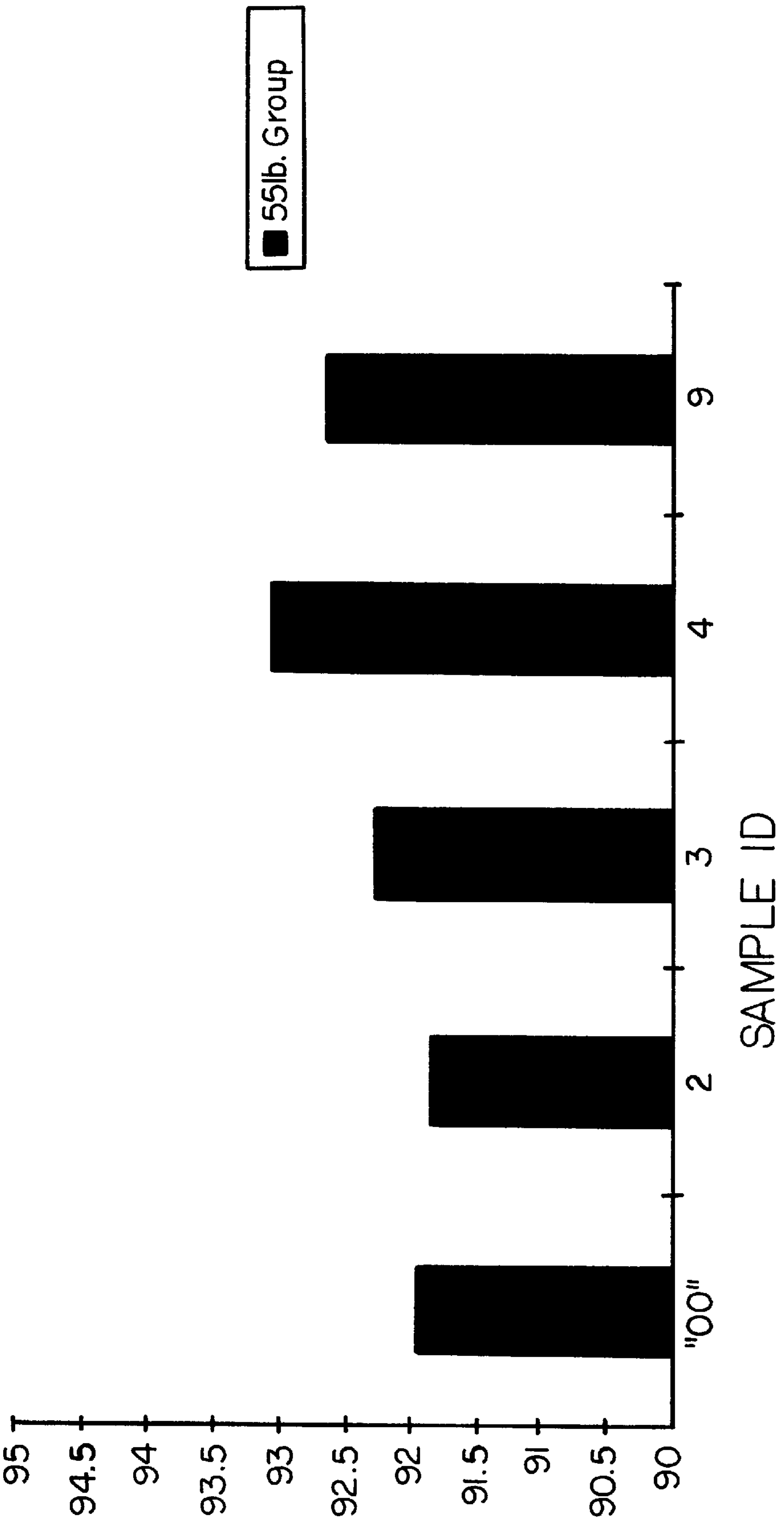
FIG. 6A shows the opacity of the 55 pound paper group of the samples.
Figure 6B:
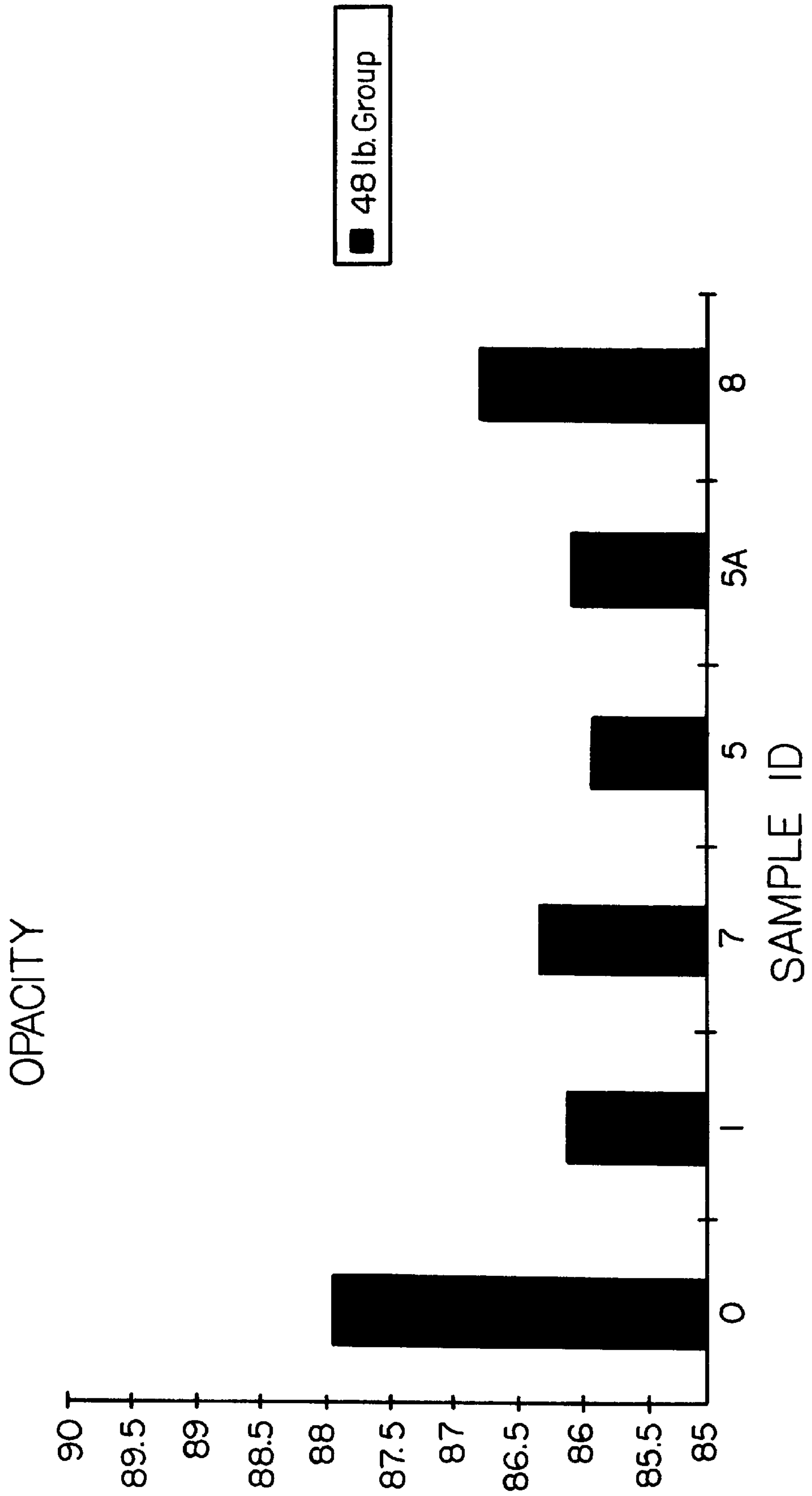
FIG. 6B shows the opacity of the 48 pound paper group of the samples.

The addition of the smectite clay also did not adversely affect the brightness (FIG. 5) or opacity of the paper as shown in FIGS. 6A and 6B.

3. Strength of Paper

Figure 7A:
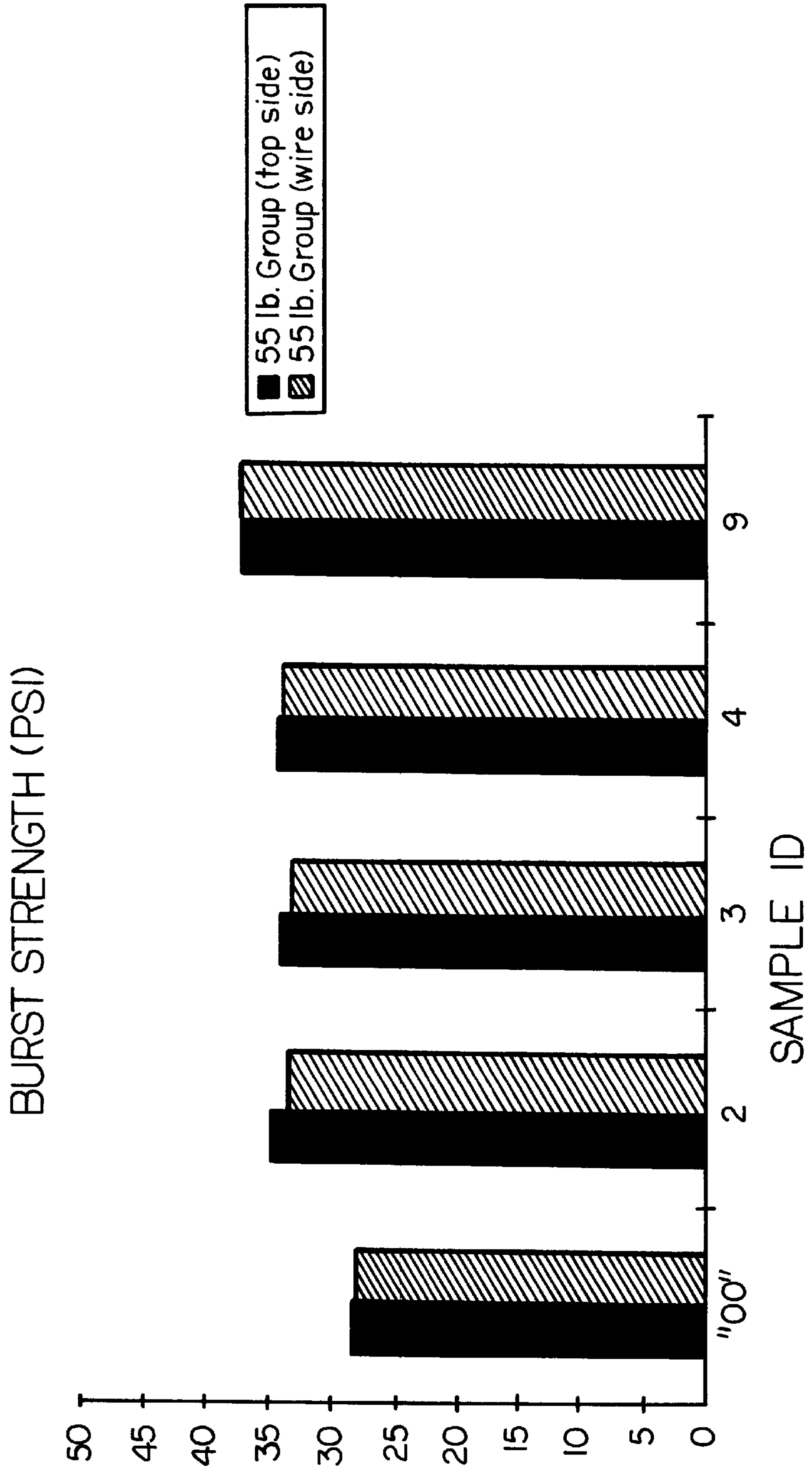
FIG. 7A shows the burst strength of the 55 pound paper group of the samples.
Figure 7B:
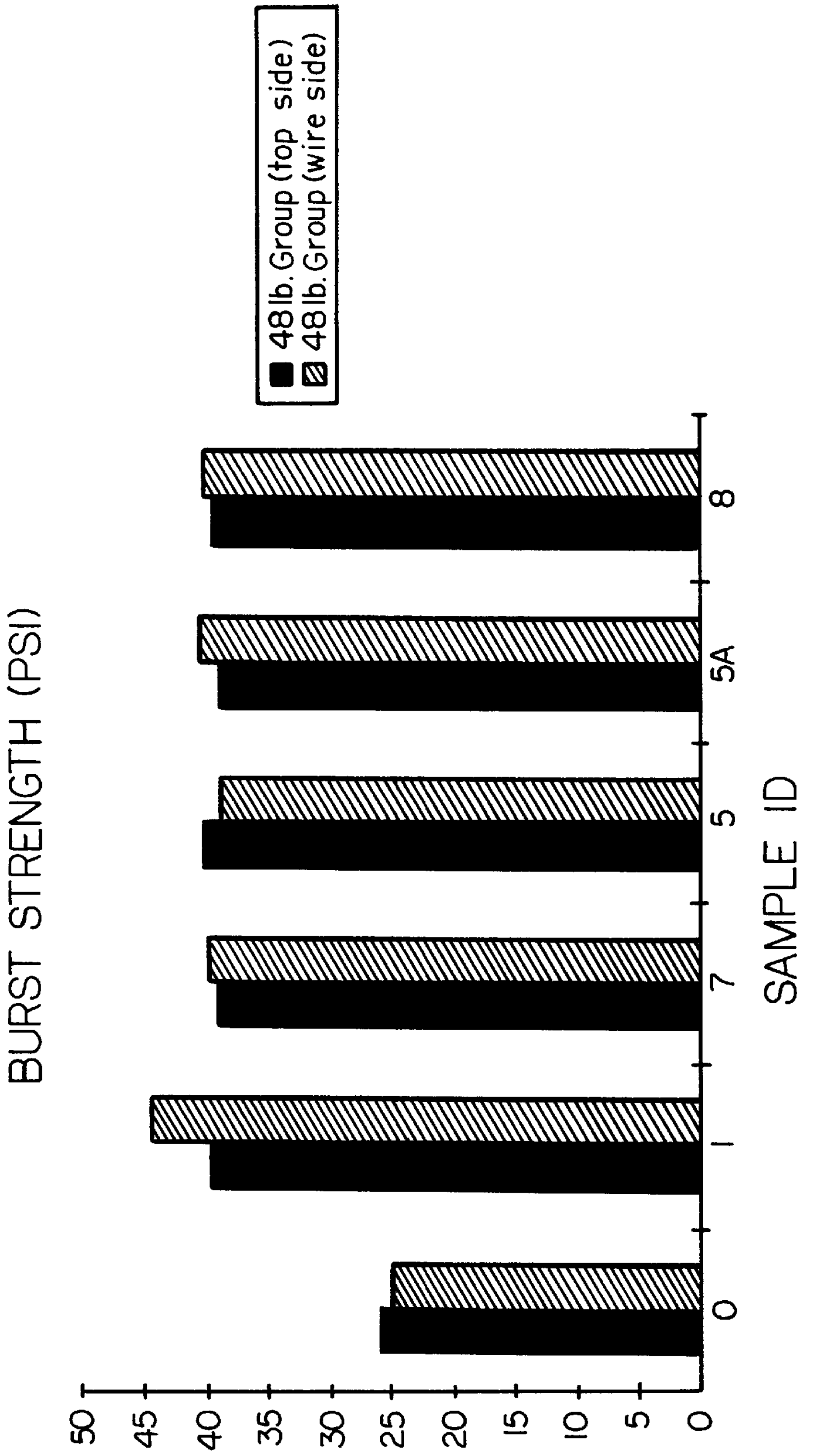
FIG. 7B shows the burst strength of the 48 pound paper group of the samples.
Figure 8A:
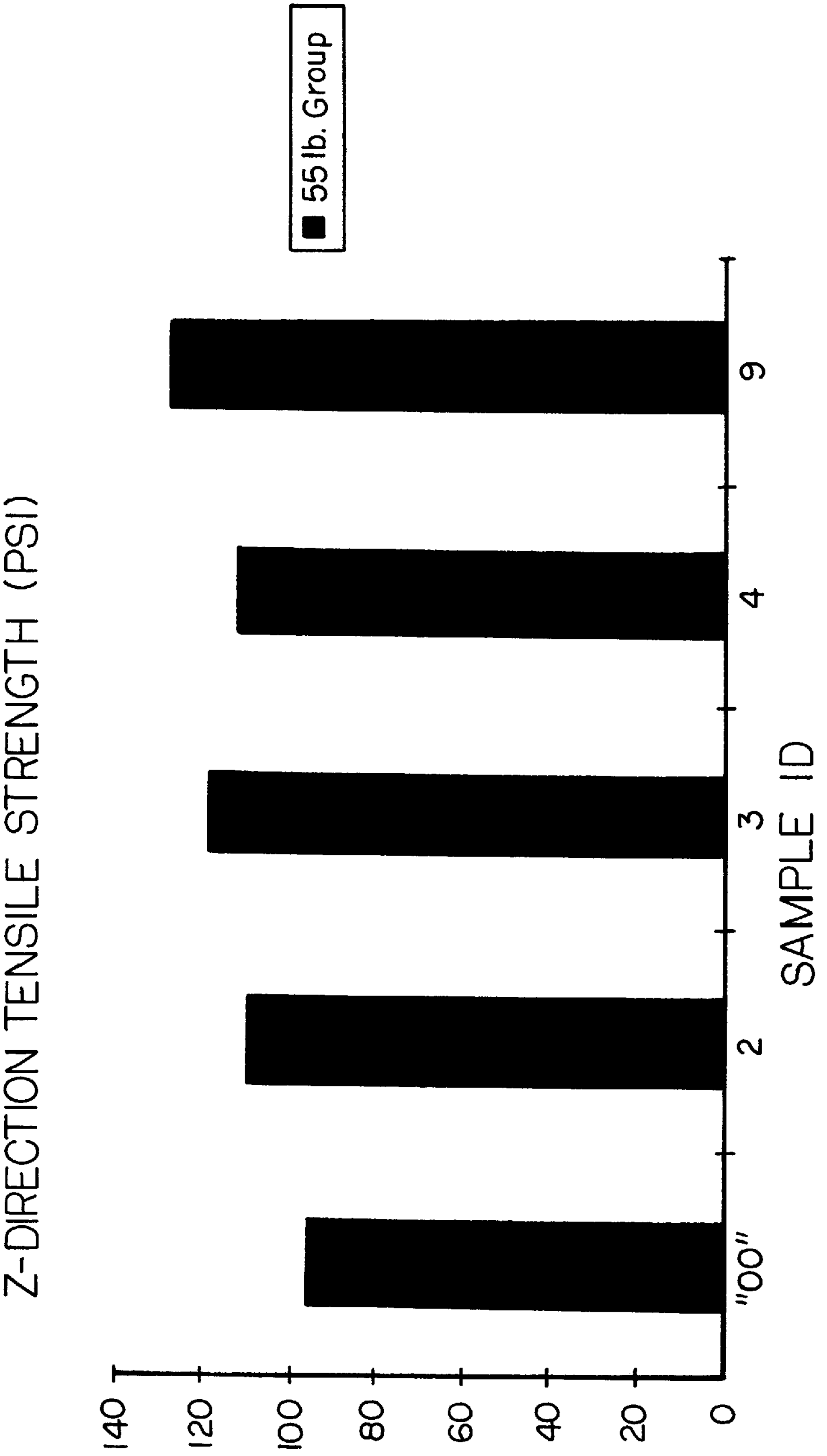
FIG. 8A shows the z-direction tensile strength of the 55 pound paper group of the samples.
Figure 8B:
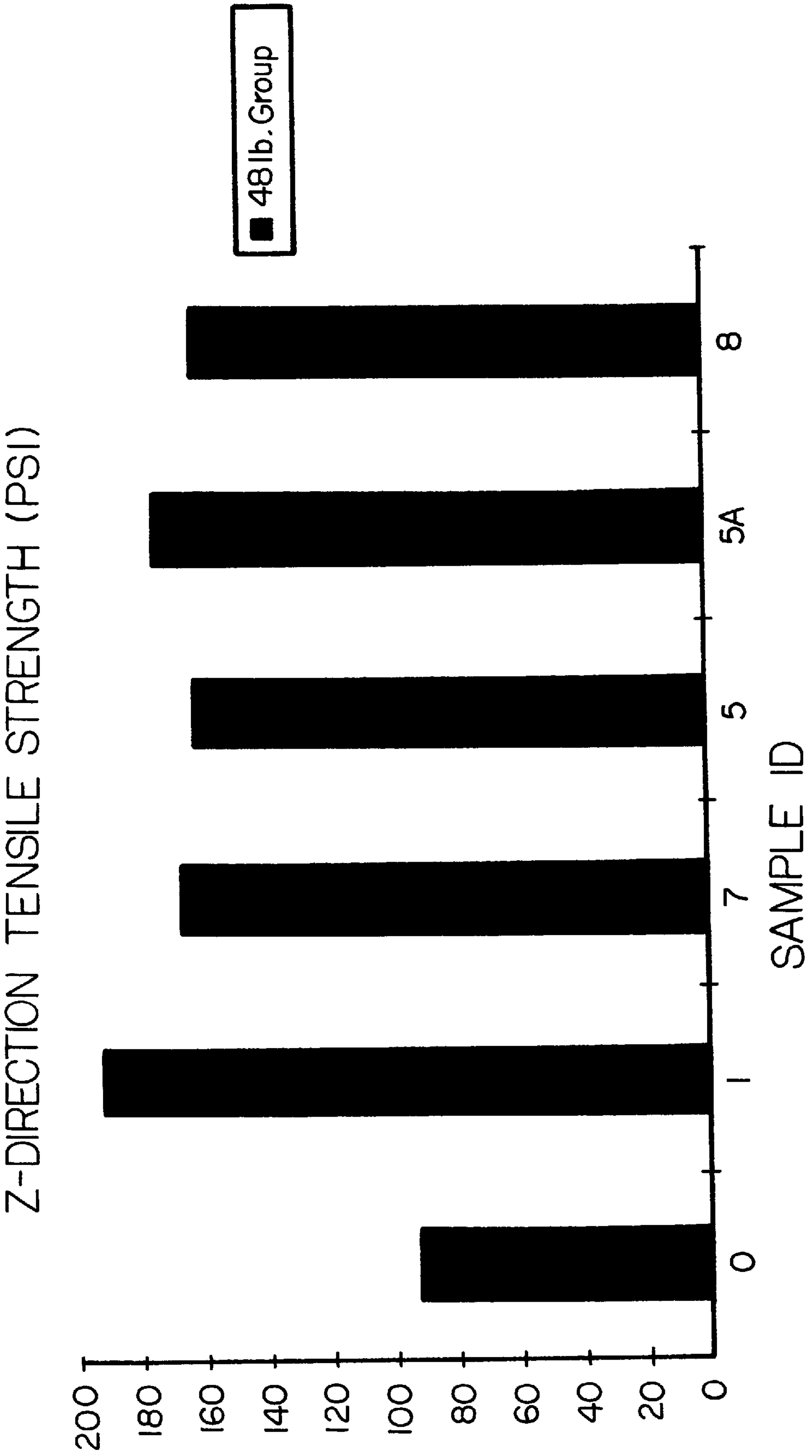
FIG. 8B shows the z-direction tensile strength of the 48 pound paper group of the samples.

There was again no adverse reduction in the strength of the paper as a result of adding smectite clay to the starch as shown in FIGS. 7A, 7B, 8A and 8B. Thus, its utilization did not decrease the burst strength of the paper coated with the hydroxyethylated starch and smectite clay. FIGS. 7A and 7B. In addition, the Z-strength tensile strength was also not adversely affected by the introduction of a swellable bentonite. FIGS. 8A and 8B.

4. Wax Pick Strength

Figure 9:
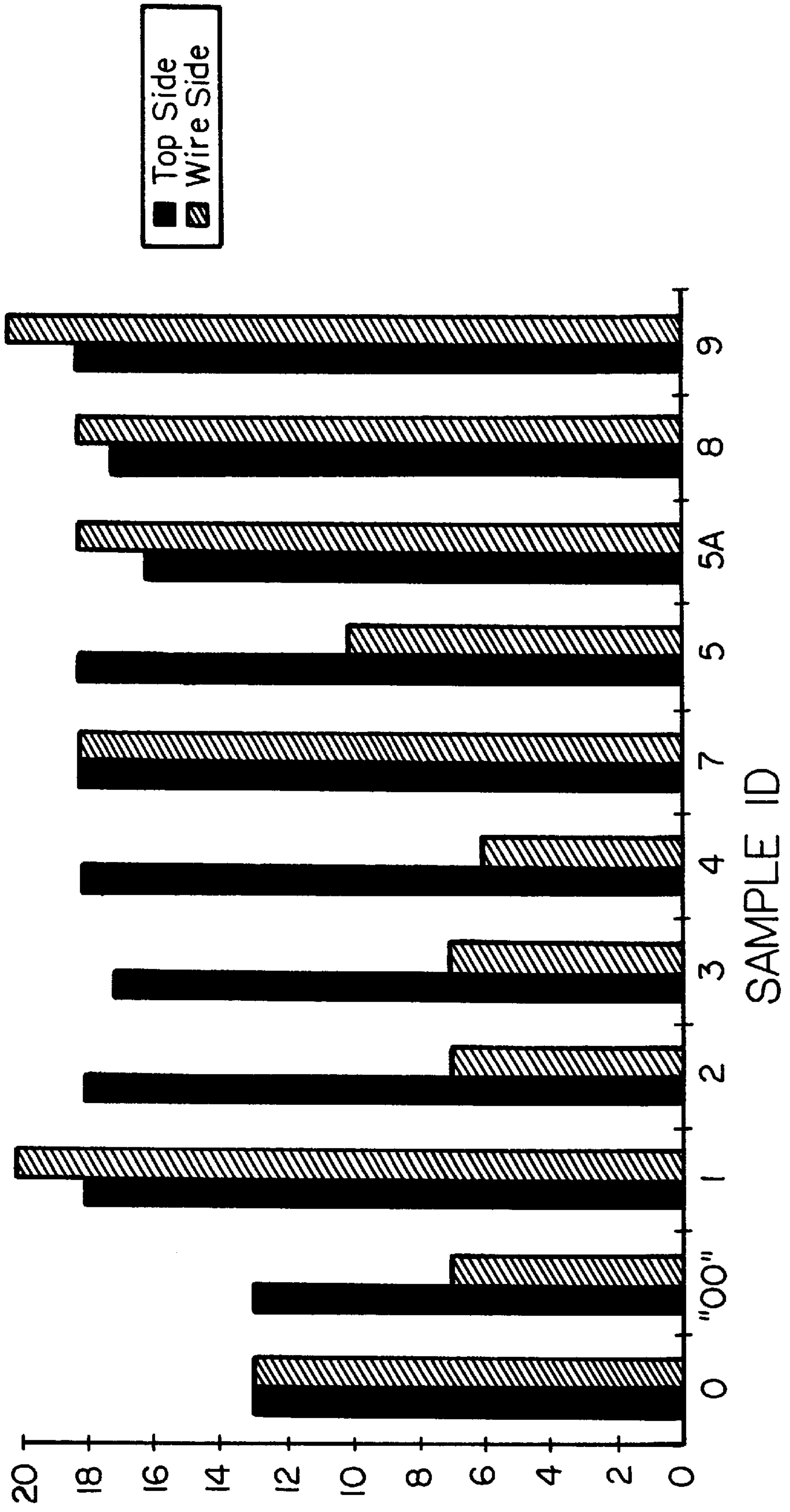
FIG. 9 shows the wax pickup of the samples.

There was no significant difference in wax pick strength of the paper coated smectite clay over the paper coated with the hydroxyethylated starch-based coating composition alone as shown in FIG. 9.

5. Fold Strength

Figure 10A:
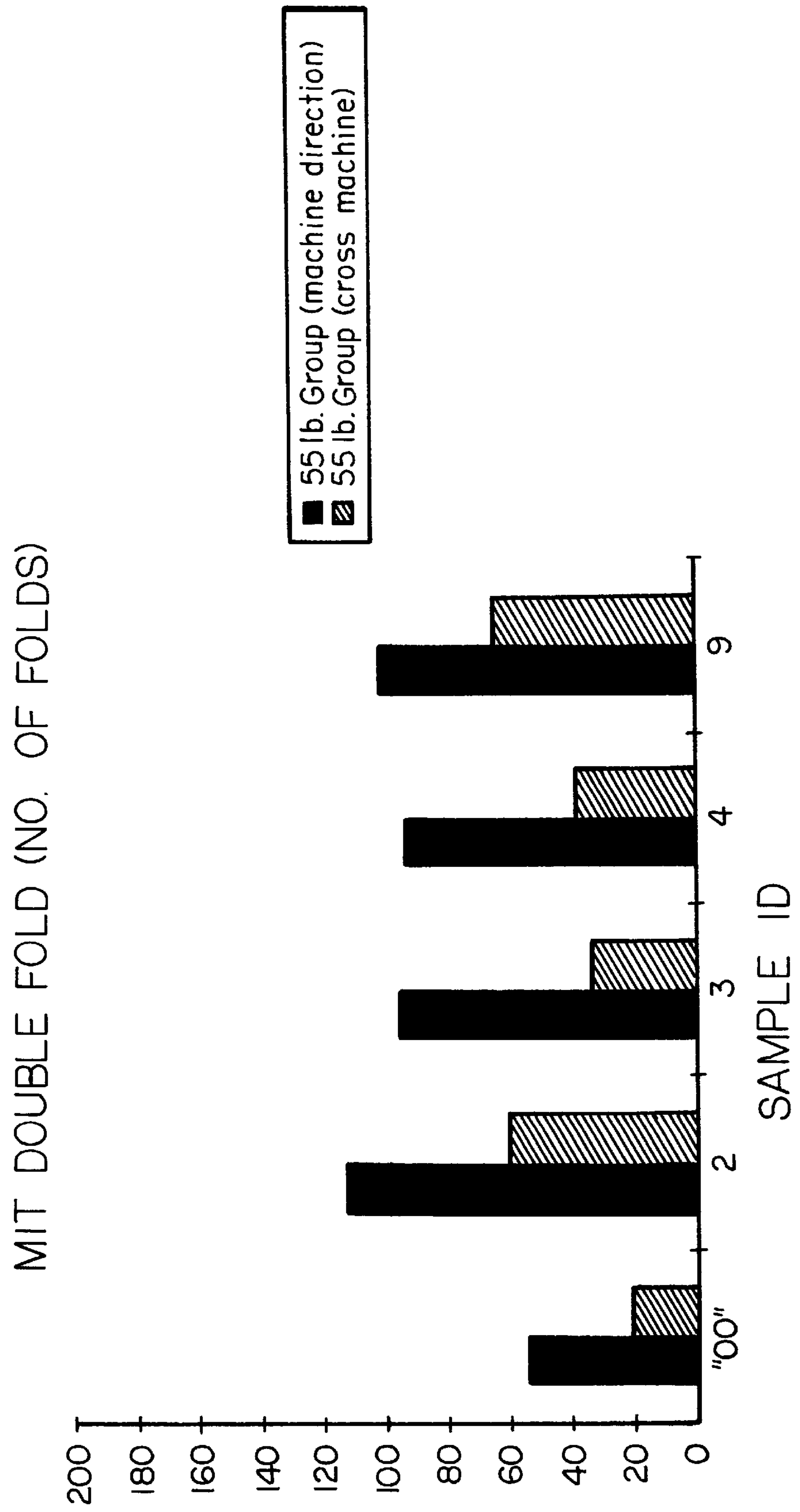
FIG. 10A shows the fold strength for the 55 pound paper group of the samples.
Figure 10B:
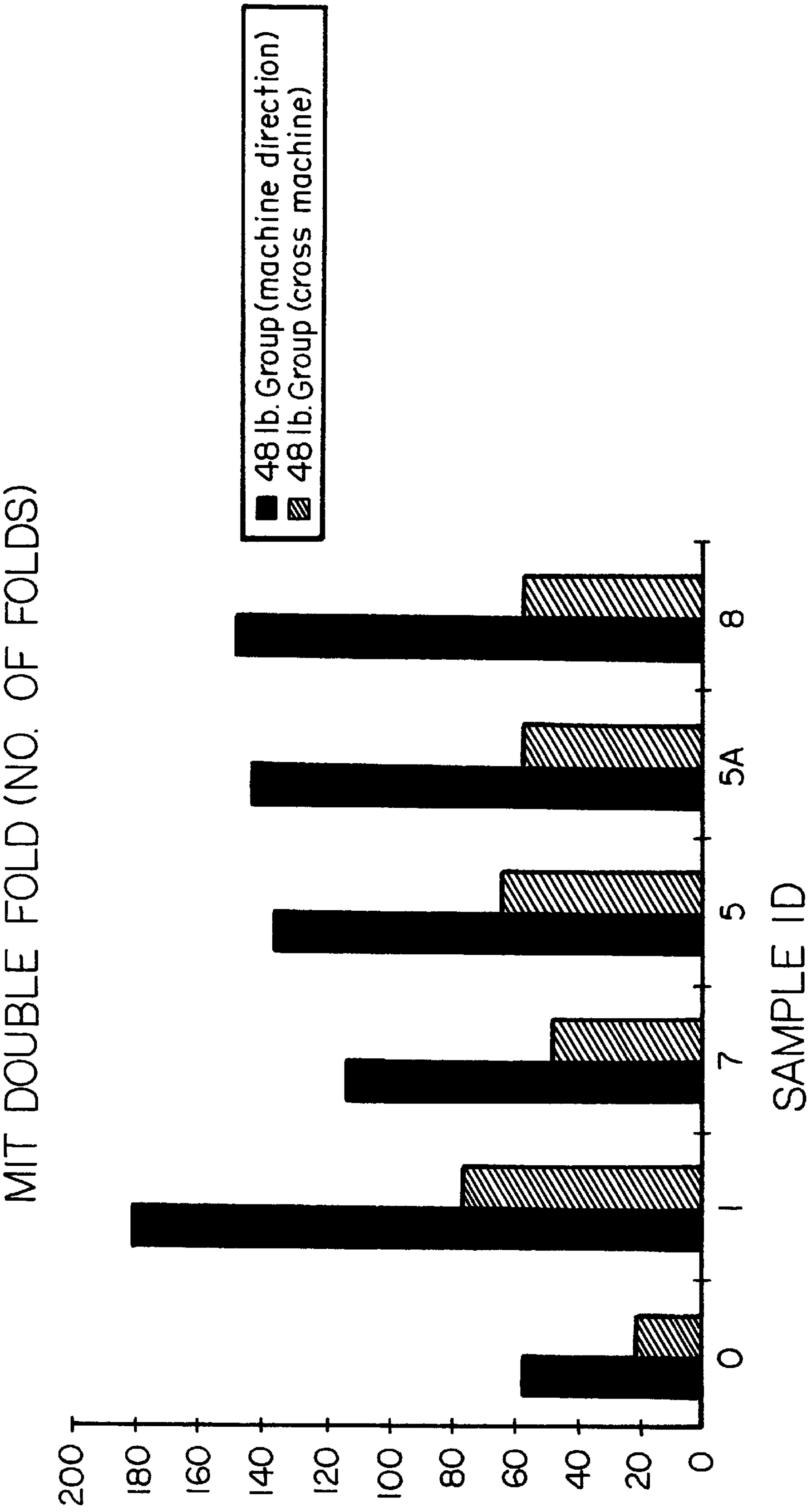
FIG. 10B shows the fold strength for the 48 pound paper group of the samples.

MIT double fold strength is a measure of the suitability of a paper for applications, such as magazines, where significant folding stress is placed on the paper. The introduction of the smectite clay to the coating composition did not adversely affect the suitability of the paper for such usages as shown in FIGS. 10A and 10B.

6. Retrogradation

Figure 11:
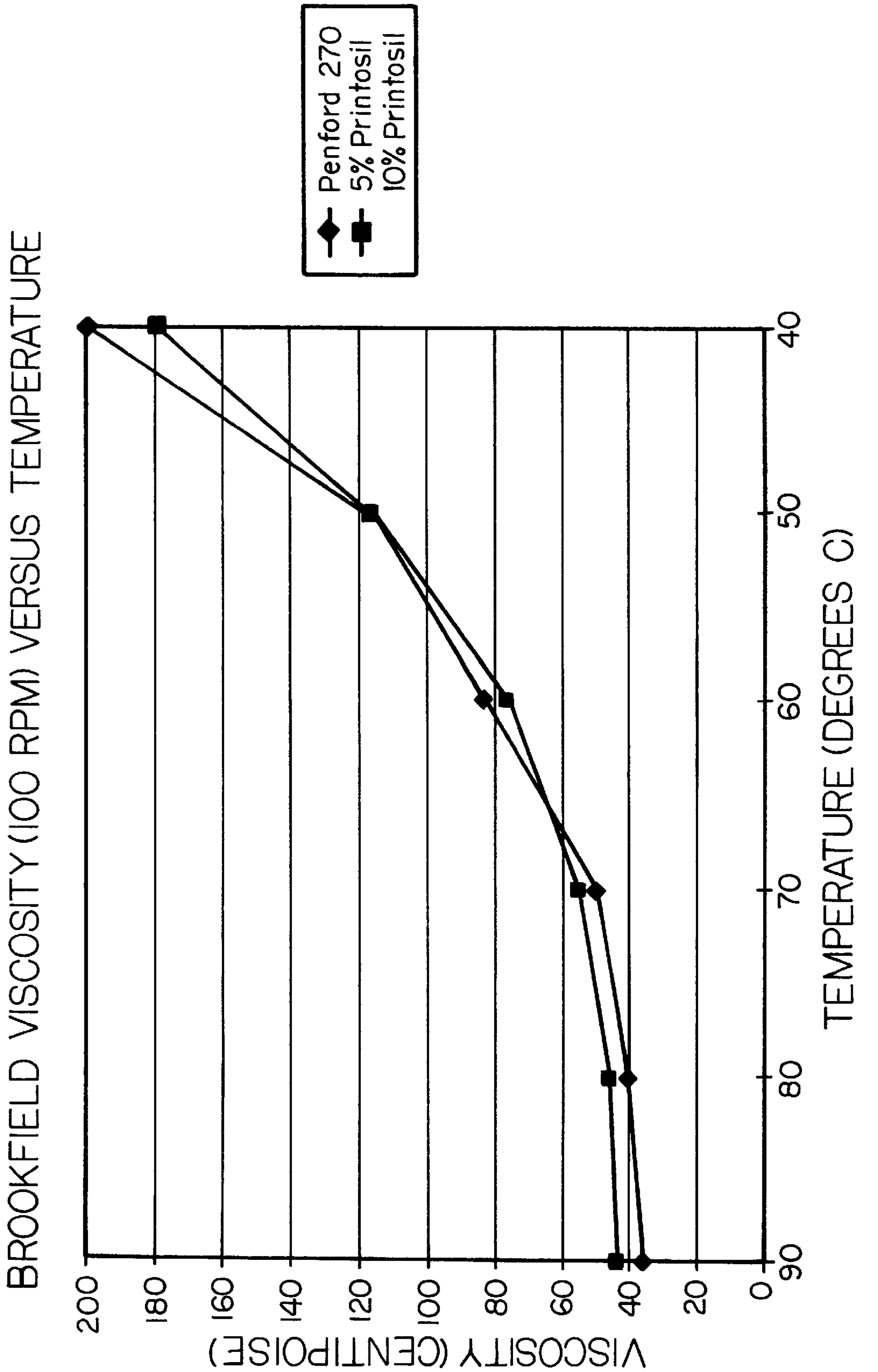
FIG. 11 shows the Brookfield viscosity for three of the samples.

The advantages of the use of a smectite with the starch for the coating composition is also shown by the reduced retrogradation. As conventional paper coating compositions containing starch cool, there is a tendency for the viscosity to increase. By mixing a smectite clay with the starch, the extent of the increase in viscosity is reduced over compositions wherein starch alone is used without the smectite clays. This effect is shown in FIG. 11 wherein the three examples show coating compositions containing either solely starch (Penford 270) or combinations of starch and clay. The reference to 5% Printosil and 10% Printosil is to the percentage of smectite clay that is contained within the solids portion of the coating compositions.

7. Timing of Combination of Starch and Smectite Clay

Figure 12:
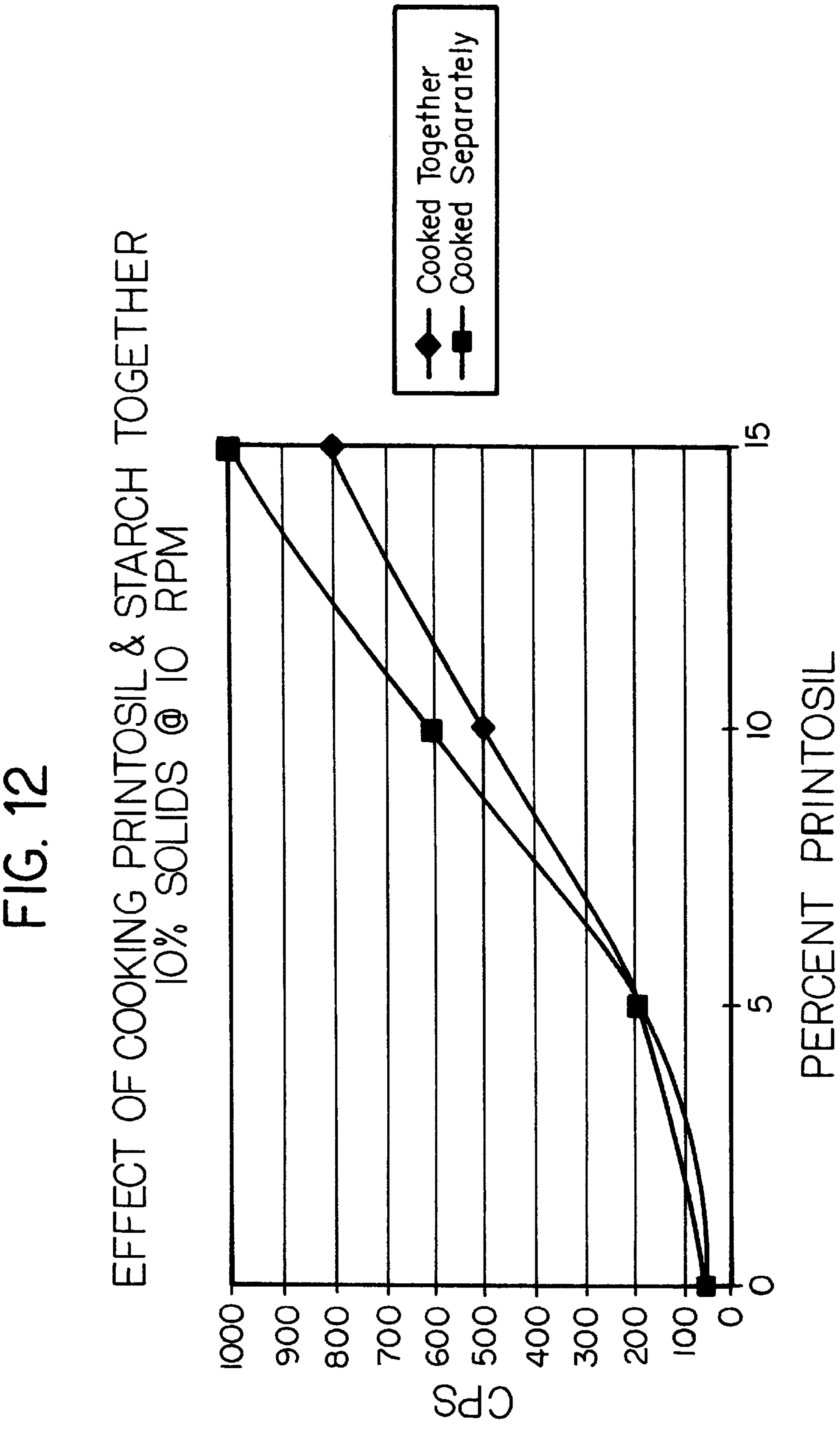
FIG. 12 shows the effect of cooking starch with the clay together rather than separately tested at 10 rpm of the samples.
Figure 13:
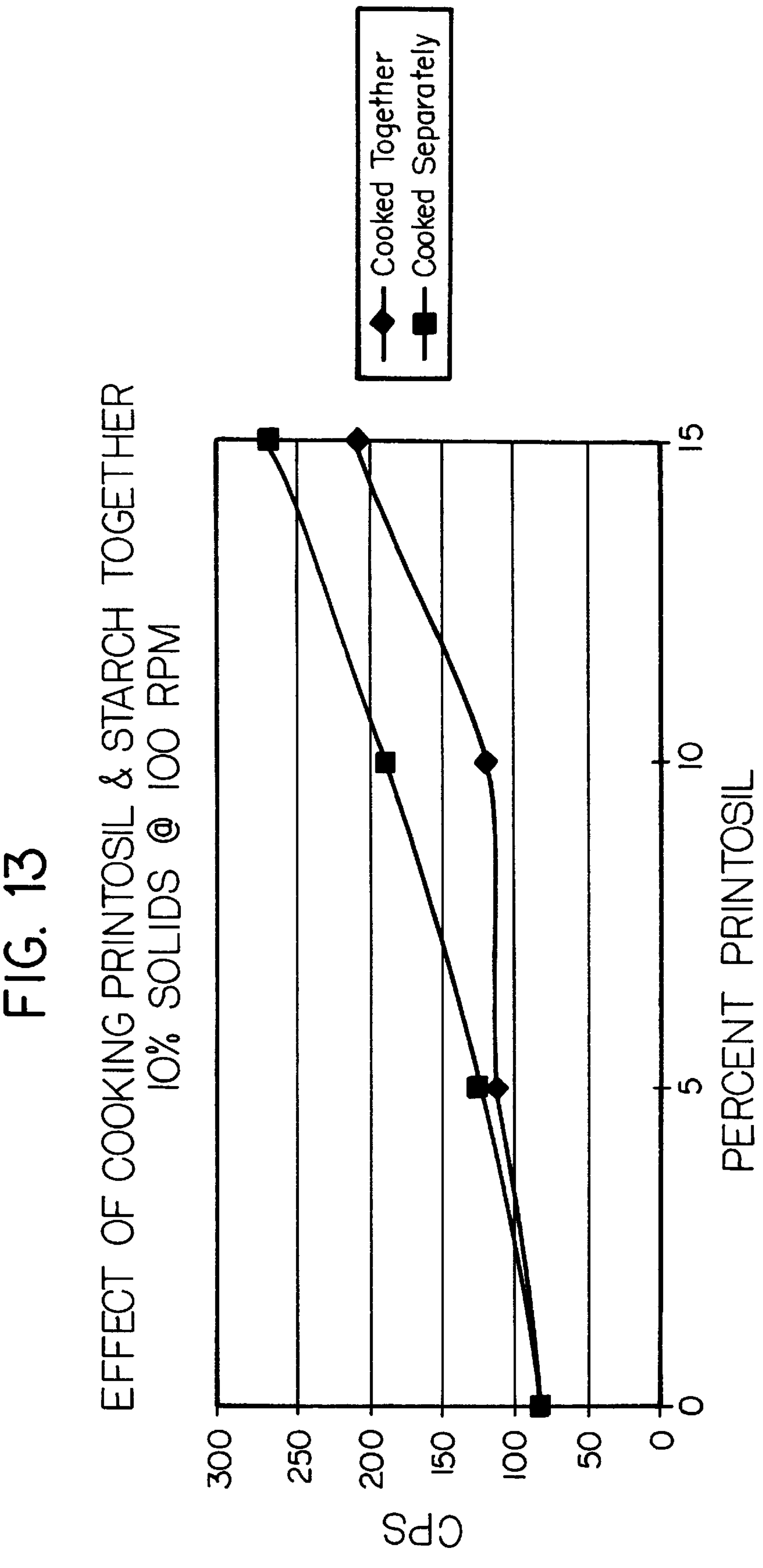
FIG. 13 shows the effect of cooking starch with the clay together rather than separately tested at 100 rpm of the samples.

The advantage of combining the smectite clay with the starch prior to the modification or cooking of the starch is shown by FIGS. 12 and 13. The two reference lines show a comparison of the effect of cooking the two components together and cooking them separately. FIG. 12 shows the effects on Brookfield viscosity at 10 rpm while FIG. 13 shows the effect at 100 rpm. As can be seen from these Tables, as the percentage of the clay contained in the coating composition increases, the viscosity of the coating composition in which the starch and Printosil were cooked together does not rise as quickly in comparison to the viscosity of a coating composition in which the Printosil was blended with the starch after cooking.

CONCLUSION

From a review of all of these tests, it is clear that the use of smectite clays when added to starch for coating of paper significantly decreased the porosity of the coating without adversely affecting any of the optical or strength properties of the paper.

I claim:

1. An aqueous coating composition for the coating of paper or paper boards comprising from about 5 to about 25 percent by weight solids, wherein the solids comprise about 75 to about 95 parts by weight of a cooked, substantially hydrated starch and about 5 to about 25 parts by weight of a smectite clay.

2. The aqueous coating composition of claim 1 wherein the solids comprise about 90 to about 95 parts by weight cooked, substantially hydrated starch and about 5 to about 10 parts by weight of a smectite clay.

3. The aqueous coating composition of claim 1 wherein the smectite clay has been precleaned to remove substantially all of the nonsmectite particles.

4. The aqueous coating composition of claim 1 wherein the smectite clay has a surface area from about 200 to about 800 $m^2/g$.

5. The aqueous coating composition of claim 1 wherein the smectite clay has a viscosity of about 50 to about 5,000 centipoise in an aqueous solution when said clay comprises 10 percent by weight of the solution.

6. The aqueous coating composition of claim 1 wherein the smectite clay has an aspect ratio from about 200 to about 1,000.

7. The aqueous coating composition of claim 1 wherein the smectite clay is comprised of fine particles, at least about 90 percent less than 2 $\mu$m in size.

8. The aqueous coating composition of claim 1 wherein the smectite clay has a surface area of about 200 to about 800 $m^2/g$, a viscosity of about 50 to 5,000 centipoise when mixed in a solution of about 10 percent solids and an aspect ratio of about 200 to 1,000/1.

9. The aqueous coating composition of claim 1 wherein the starch is a hydroxyethylated starch.

10. The aqueous coating composition of claim 1 wherein the starch is a cationic starch.

11. The aqueous coating composition of claim 1 wherein the smectite clay is selected from the group consisting of bentonite, hectorie, nontronite, montmorillonite and saponite.

12. The aqueous coating composition of claim 11 wherein the smectite clay is predominately bentonite clay.

13. A process for the coating of paper with an aqueous coating composition comprising preparing an uncoated paper product, preparing a smectite clay, wherein the smectite clay has been substantially cleaned, preparing a starch solution by cooking the starch solution for a sufficient period of time to hydrate substantially the starch, combining the smectite clay with the starch solution to produce a smectite clay/starch coating composition wherein the coating composition contains about 5 to about 25 percent by weight solids, wherein the solids comprise about 5 to about 25 percent smectite clay and about 95 to about 75 percent starch, and coating the uncoated paper product with the coating composition to produce a finished paper product.

14. The process of claim 13 wherein the starch solution is prepared by cooking the starch at a temperature of at least about 70° C. for at least about 20 minutes.

15. The process of claim 14 wherein the smectite clay is added to the starch solution prior to the cooking of the starch solution.

16. The process of claim 13 wherein the solids comprise about 90 to about 95 parts by weight starch and about 5 to about 10 parts by weight smectite clay.

17. The process of claim 13 wherein the smectite clay has a surface area from about 200 to about 800 $m^2/g$.

18. The process of claim 13 wherein the smectite clay has a viscosity in an aqueous solution of about 50 to about 5,000 centipoise, when said clay comprises about 10 percent by weight of the solution.

19. The process of claim 13 wherein the smectite clay has an aspect ratio from about 200 to about 1,000.

20. The process of claim 13 wherein the smectite clay is comprised of fine particles, at least about 90 percent less than 2 $\mu$m in size.

21. The process of claim 13 wherein the smectite clay has a surface area of about 200 to about 800 $m^2/g$, a viscosity of about 100 to 3,000 centipoise when mixed in a solution of about 10 percent solids and an aspect ratio of about 200 to 1,000/1.

22. The process of claim 13 wherein the starch is a hydroxyethylated starch.

23. The process of claim 13 wherein the starch is a cationic starch.

24. A process for the coating of paper with an aqueous coating composition comprising preparing an uncoated paper product, preparing a smectite clay, wherein the smectite clay has been substantially cleaned, preparing a starch solution, combining the smectite clay with the starch solution to produce a smectite clay/starch coating composition wherein the coating composition contains about 5 to about 25 percent by weight solids, wherein the solids comprise about 5 to about 25 percent smectite clay and about 95 to about 75 percent starch, cooking the smectite clay/starch coating composition for a sufficient period of time and at a sufficient temperature to hydrate substantially the starch, and coating the uncoated paper product with the coating composition to produce a finished paper product.

* * * * *